United States Patent
Tsubusaki

(10) Patent No.: US 9,756,246 B2
(45) Date of Patent: Sep. 5, 2017

(54) IMAGING APPARATUS

(71) Applicant: CANON KABUSHIKI KAISHA, Tokyo (JP)

(72) Inventor: Akihiro Tsubusaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/951,311

(22) Filed: Jul. 25, 2013

(65) Prior Publication Data

US 2014/0028864 A1 Jan. 30, 2014

(30) Foreign Application Priority Data

Jul. 28, 2012 (JP) ................... 2012-167832

(51) Int. Cl.
*H04N 5/232* (2006.01)
*G03B 5/00* (2006.01)
*G03B 7/00* (2014.01)
*G03B 3/10* (2006.01)
*G03B 17/02* (2006.01)

(52) U.S. Cl.
CPC ........... *H04N 5/23245* (2013.01); *G03B 3/10* (2013.01); *G03B 5/00* (2013.01); *G03B 7/00* (2013.01); *G03B 17/02* (2013.01); *H04N 5/23212* (2013.01); *H04N 5/23258* (2013.01); *H04N 5/23287* (2013.01); *H04N 5/23293* (2013.01)

(58) Field of Classification Search
CPC ............ H04N 5/23287; H04N 5/2353; H04N 5/23245; H04N 5/23258; H04N 5/23293; H04N 5/23212; G03B 3/10; G03B 5/00; G03B 7/00; G03B 17/02

USPC .................................................... 348/208.12
See application file for complete search history.

(56) References Cited

U.S. PATENT DOCUMENTS

| | | | |
|---|---|---|---|
| 5,438,190 A * | 8/1995 | Kaneda et al. ............ 250/201.3 |
| 5,973,857 A * | 10/1999 | Kaneda ........................ 359/701 |
| 6,630,950 B1* | 10/2003 | Ohkawara et al. ...... 348/208.12 |
| 7,672,578 B2* | 3/2010 | Shibata .................. H04N 5/232 |
| | | | 348/208.11 |
| 2004/0201770 A1* | 10/2004 | Sawachi ............ H04N 5/23212 |
| | | | 348/350 |
| 2006/0072028 A1* | 4/2006 | Hong ........................ 348/333.01 |
| 2006/0143235 A1* | 6/2006 | Takaku ...................... 707/104.1 |
| 2011/0050923 A1* | 3/2011 | Nomura et al. ......... 348/208.99 |
| 2011/0261251 A1* | 10/2011 | Okamoto ............... G02B 7/102 |
| | | | 348/345 |
| 2012/0154615 A1* | 6/2012 | Noguchi ............ H04N 5/23258 |
| | | | 348/208.6 |

FOREIGN PATENT DOCUMENTS

| | | |
|---|---|---|
| CN | 101035205 A | 9/2007 |
| JP | H07-135596 A | 5/1995 |
| JP | 7-333665 A | 12/1995 |
| JP | 2007-065385 A | 3/2007 |
| JP | 2010-217778 A | 9/2010 |

(Continued)

*Primary Examiner* — Luong T Nguyen
(74) *Attorney, Agent, or Firm* — Canon U.S.A., Inc. IP Division

(57) ABSTRACT

An imaging apparatus is such that in a case where an operation is instructed by an operation member, a mode changing unit changes operation modes or control amounts in the operation modes of at least two controllers from among a plurality of controllers.

17 Claims, 14 Drawing Sheets

(56) References Cited

FOREIGN PATENT DOCUMENTS

| | | |
|---|---|---|
| JP | 2011-004279 A | 1/2011 |
| JP | 2011-039206 A | 2/2011 |
| JP | 2011-215199 A | 10/2011 |
| WO | 2007/066578 A1 | 6/2007 |

* cited by examiner

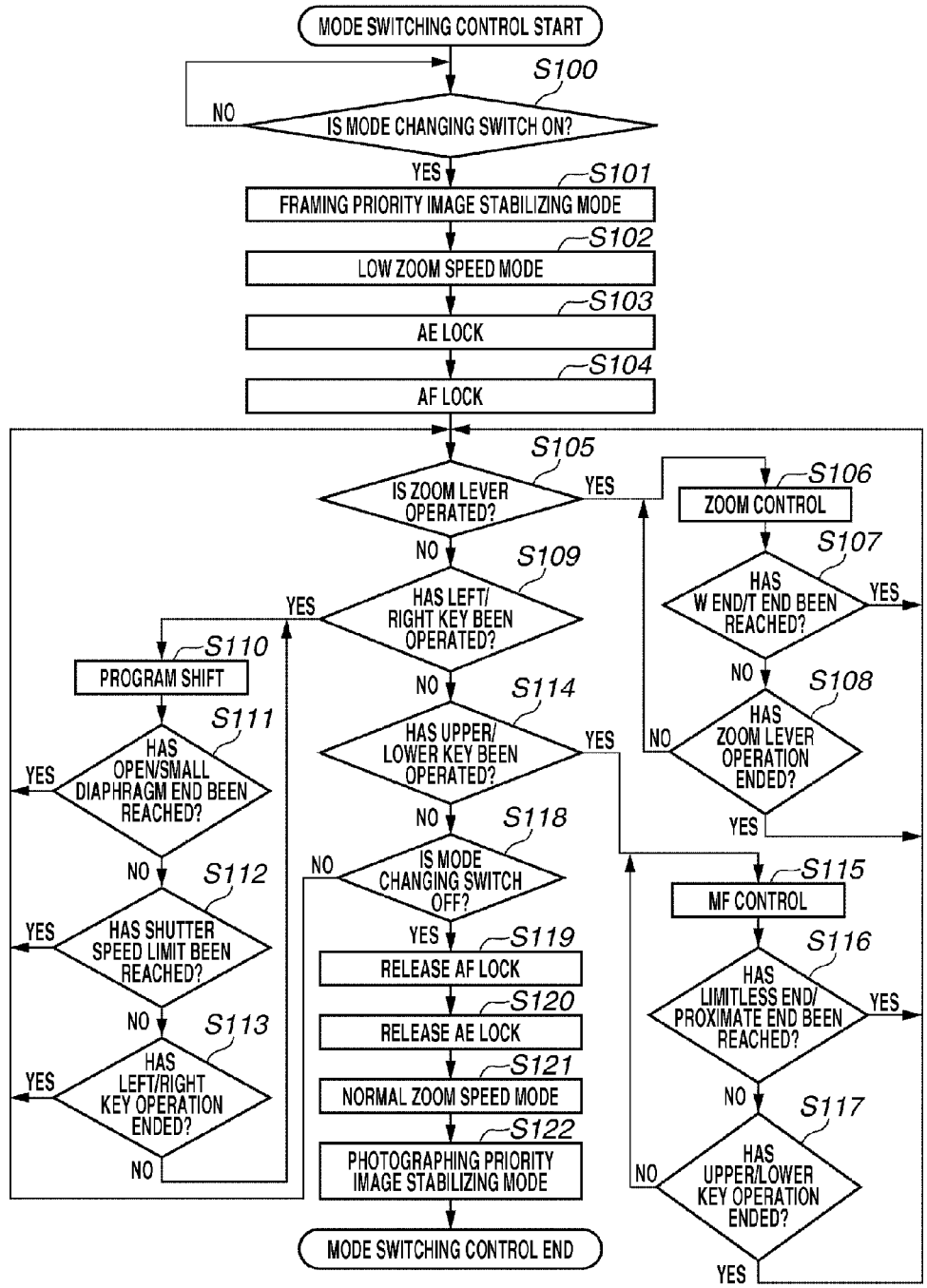

FIG.13A
ZOOM CONTROL

| MODE CHANGING SWITCH STATE | PHOTOGRAPHING MODE | ZOOM LENS OPERATION AMOUNT | ZOOM SPEED |
|---|---|---|---|
| OFF | EVF | LARGE | 800pps |
| OFF | EVF | SMALL | 400pps |
| OFF | MOVING IMAGE BEING RECORDED | LARGE | 400pps |
| OFF | MOVING IMAGE BEING RECORDED | SMALL | 200pps |
| ON | EVF | LARGE | 400pps |
| ON | EVF | SMALL | 200pps |
| ON | MOVING IMAGE BEING RECORDED | LARGE | 200pps |
| ON | MOVING IMAGE BEING RECORDED | SMALL | 100pps |

FIG.13B
EXPOSURE CONTROL

| MODE CHANGING SWITCH STATE | EXPOSURE CONTROL AMOUNT |
|---|---|
| OFF | 1Ev |
| ON | 1/3Ev |

FIG.13C
FOCUS CONTROL

| MODE CHANGING SWITCH STATE | UPPER/LOWER KEY PRESSING TIME | FOCUS SPEED |
|---|---|---|
| OFF | LONG | 400pps |
| OFF | SHORT | 200pps |
| ON | LONG | 200pps |
| ON | SHORT | 100pps |

FIG.13D
IMAGE STABILIZING CONTROL

| MODE CHANGING SWITCH STATE | PHOTOGRAPHING MODE | SHAKING AMOUNT | CUTOFF FREQUENCY |
|---|---|---|---|
| OFF | EVF | LARGE | 2.0Hz |
| OFF | EVF | SMALL | 0.1Hz |
| OFF | MOVING IMAGE BEING RECORDED | LARGE | 2.0Hz |
| OFF | MOVING IMAGE BEING RECORDED | SMALL | 0.1Hz |
| ON | EVF | LARGE | 0.05Hz |
| ON | EVF | SMALL | 0.05Hz |
| ON | MOVING IMAGE BEING RECORDED | LARGE | 2.0Hz |
| ON | MOVING IMAGE BEING RECORDED | SMALL | 0.05Hz |

IMAGING APPARATUS

BACKGROUND OF THE INVENTION

Field of the Invention

The present invention relates to an imaging apparatus, and more particularly to a photographing control technology.

Description of the Related Art

A certain imaging apparatus such as a digital camera has an optical magnification (optical zooming) function realized by driving of a zoom lens, and an electronic magnification (electronic zooming) function of magnifying a part of an image-captured region. Recent improvement of the zoom lens performance enables photographing from a super-wide-angle state to a super-telephoto state by the same lens, and high pixelation of an image sensor enables photographing capable of obtaining sufficient resolution even when an enlargement magnification is increased. The higher magnification has been accompanied by complexity of operation methods for field angle adjustment, focus adjustment, and exposure adjustment, so that a technology for improving operability has been discussed. For example, Japanese Patent Application Laid-Open No. 2007-65385 discusses an optical device improved in operability of an adjustment method of a zooming speed. In this device, whether to change a speed depending on a pressing amount of a zooming operation can be selected by a zoom mode changing switch. Japanese Patent Application Laid-Open No. 7-333665 discusses an image stabilizing device improved in operability of image stabilizing mode selection. In this device, erroneous execution of shake correction can be prevented by arranging two switches, namely, an image stabilizing mode setting switch and an image stabilizing starting switch.

The imaging apparatus of a high magnification must include a unit for quickly changing the zoom from a wide angle to a telephoto state, and a unit for enabling subtle field angle adjustment, and a state must be switched between the two units so that a photographer does not lose shutter chance with the imaging apparatus of a high magnification.

In the case of manually performing focus adjustment and exposure adjustment, a method for easily switching between quick adjustment unit and a subtle adjustment unit is required. In the case of photographing in a super-telephoto state, due to an influence of camera shake and low-region shaking caused by shaking of an entire body, a still object enters/exists from a field angle, creating a problem of difficult field angle adjustment. To solve these problems, there has been discussed a method for easily changing modes by arranging a mode changing operation member.

However, when a member is arranged for each of field angle adjustment, focus adjustment, and exposure adjustment operations, it is not easy to arrange all the members at positions of high operability. Further, there is a possibility that since a plurality of members is arranged, a member not intended to be operated is operated, causing an erroneous operation.

SUMMARY OF THE INVENTION

The present invention is directed to an imaging apparatus capable of improving operability of field angle adjustment, focus adjustment, and exposure adjustment with a small number of operation members.

According to an aspect of the present invention, an imaging apparatus configured to receive light passed through an optical system by an image sensor to capture an image of an object, includes a plurality of controllers configured to respectively control a plurality of adjustment parameters for determining a photographing condition, a mode changing unit configured to change various operation modes of the controllers, and an operation member configured to instruct an operation to the mode changing unit. In a case where an operation is instructed by the operation member, the mode changing unit configured to change operation modes or control amounts in the operation modes of at least two controllers among the controllers.

Further features and aspects of the present invention will become apparent from the following description of exemplary embodiments with reference to the attached drawings.

BRIEF DESCRIPTION OF THE DRAWINGS

FIG. 7 is a flowchart illustrating an example of mode switching processing.

FIGS. 13A, 13B, 13C, and 13D are diagrams each illustrating an example of a relationship between a state of a mode changing switch (operation unit) and a control amount.

DESCRIPTION OF THE EMBODIMENTS

A feature of the present invention is that when an operation instruction is issued from an operation unit, a mode changing unit for changing various operation modes of control units simultaneously changes the operation modes or control amounts in the operation modes of at least two control units among the control units. More specifically, an imaging apparatus includes the following control units: a zoom control unit configured to change a field angle by optical zooming or electronic zooming, a focus control unit configured to change a focus by driving a focus lens, an exposure control unit configured to change an exposure amount by driving a diaphragm and a shutter, and an image stabilizing control unit configured to prevent camera shake by controlling an image stabilizing lens. The imaging apparatus further includes a mode changing unit configured to change various operation modes, and an operation unit arranged at a position to be operable by a left hand and configured to issue an operation instruction to the mode changing unit. When instructed by the operation unit, the mode changing unit simultaneously changes modes or control amounts of at least two control units.

Various exemplary embodiments, features, and aspects of the invention will be described in detail below with reference to the drawings.

Figure 1:
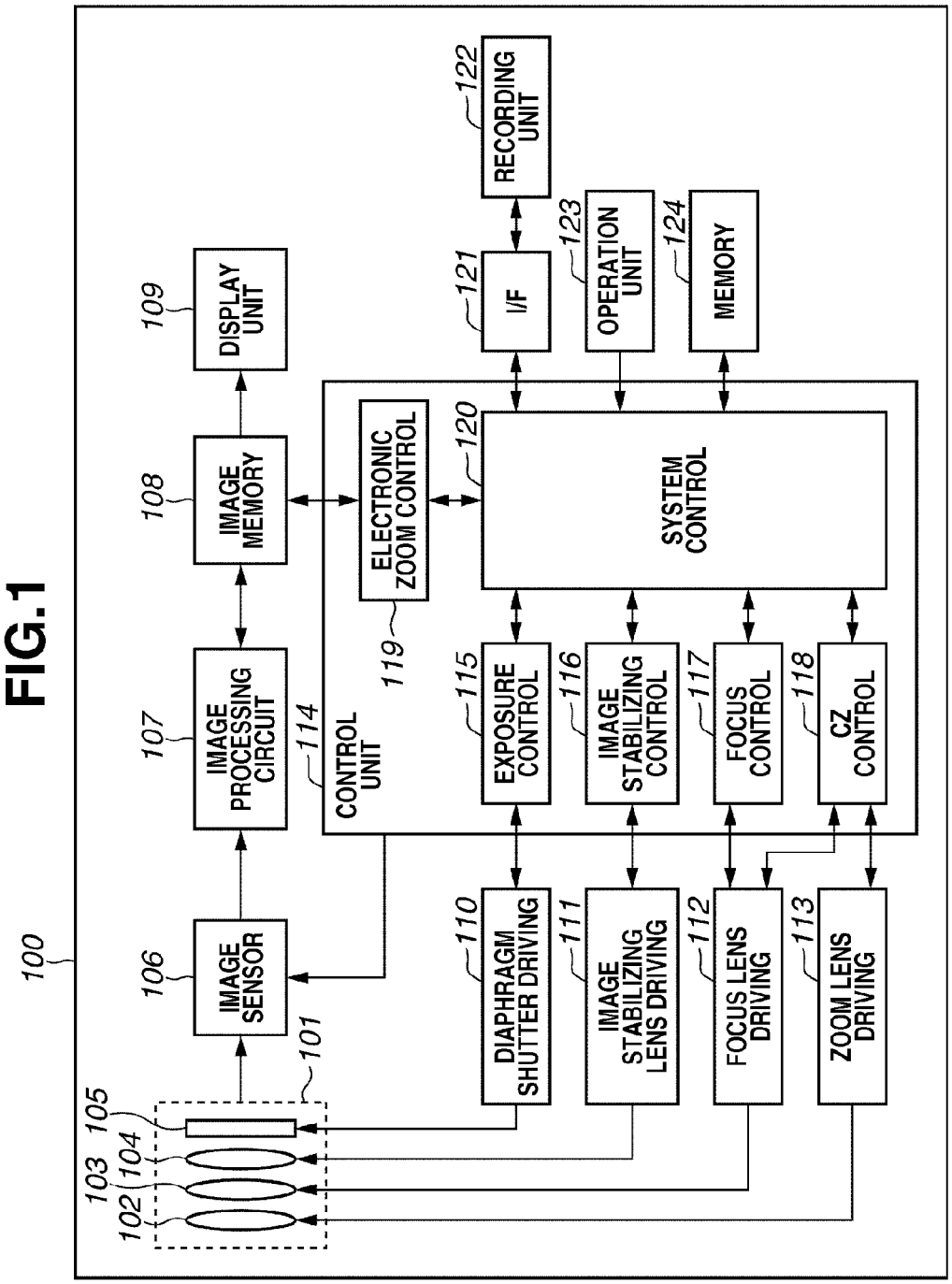
FIG. 1 is a block diagram illustrating a configuration example of a digital camera according to an exemplary embodiment of the present invention.

A first exemplary embodiment will be described. FIG. 1 is a block diagram illustrating, as an example of an imaging apparatus according to the first exemplary embodiment, a configuration example of a digital camera 100. A lens barrel 101 includes a lens group therein and performs lens driving. A zoom lens 102 optically changes a field angle by adjusting a focal distance, and a focus lens 103 adjusts focus. An image stabilizing lens 104 is a correction lens for correcting camera shake, and a diaphragm/shutter 105 for adjusting a light amount is used for exposure control. Light passed through the lens barrel 101 is received by an image sensor 106 that includes a charge-coupled device (CCD) or a complementary metal-oxide semiconductor (CMOS), and an optical signal is converted into an electric signal. The electric signal is input to an image processing circuit 107, subjected to pixel interpolation processing or color conversion processing, and then transmitted as image data to an image memory 108. The image memory 108 includes a dynamic random access memory (DRAM) or a static random access memory (SRAM).

A display unit 109, which includes a thin-film transistor driving liquid crystal display (TFT LCD), displays specific information (e.g., information about an adjustment parameter for determining a photographing condition) with captured image data. By such live-view information displaying, an electric view finder (EVF) function used by a photographer to adjust a field angle is realized. Each of driving units 110 to 113 includes a motor driver circuit that supplies current to a motor for driving each lens. The motor driver circuit outputs a signal having a voltage or a pulse width based on a control command from each of various control units 115 to 118.

A control unit 114, which includes an arithmetic unit such as a central processing unit (CPU), controls the entire camera by transmitting a control command to each unit according to a user's operation. Control of the control unit 114 concerning the present exemplary embodiment will be described. In FIG. 1, internal processing of the control unit 114 is represented by functional blocks as control units 115 to 120.

The exposure control 115 calculates an exposure control value (diaphragm value and shutter speed) based on luminance information obtained by image processing at the image processing circuit 107, and drives the diaphragm/shutter 105 by outputting a command to the diaphragm shutter driving 110 based on the calculation result. Thus, automatic exposure (AE) control is performed.

Figure 2:
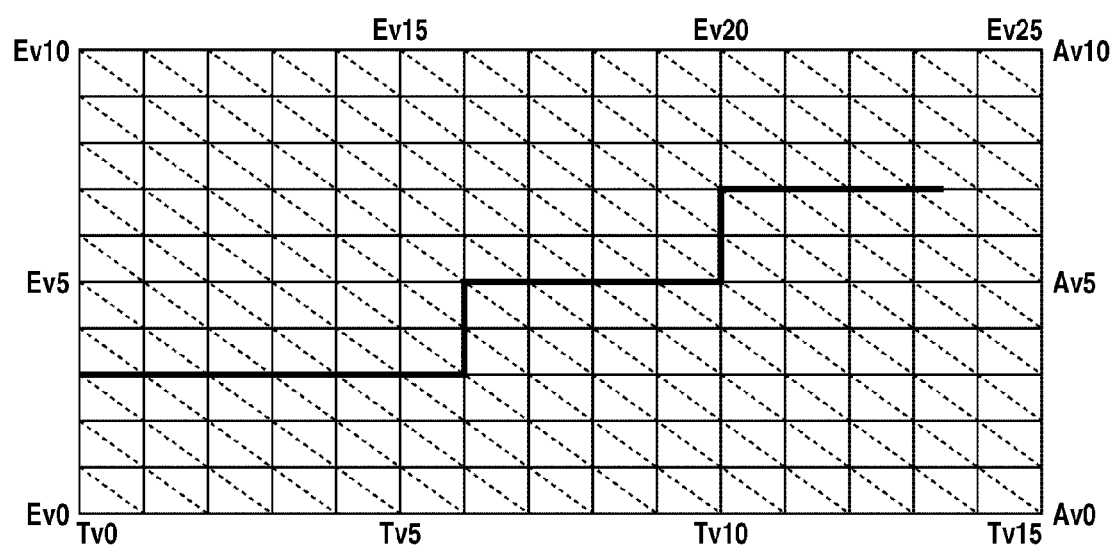
FIG. 2 is a diagram illustrating a combination example of a diagram value that is an exposure control value and a shutter speed.

FIG. 2 is a program diagram illustrating a combination of a diaphragm value and a shutter speed that are an exposure control value in the AE control. For example, when an exposure value is Ev 15, the diaphragm/shutter 105 is driven so that a diaphragm value can be Av 5 (F No. 5.6) and a shutter speed can be Tv 10 (1/1000) at appropriate exposure. In this case, for example, when exposure correction by the control operation unit for instructing an operation of a control target of the control unit is performed to an underside by a+1 stage, the diaphragm/shutter 105 is driven to achieve an exposure control value equivalent to Ev 14 in the program diagram, in other words, a shutter speed of Tv 9 (1/500). Program shifting means changing of the combination of the diaphragm value and the shutter speed without changing the exposure value. In other words, in the program diagram, the combination of the diaphragm value and the shutter speed is shifted in an oblique direction.

The image stabilizing control 116 converts an angular speed signal of an angular speed sensor (corresponds to the control operation unit) into an angular signal that is a vibration amount, and issues a driving command (or operation instruction) of the image stabilizing lens 104 to the image stabilizing lens driving unit 111.

Figure 3:
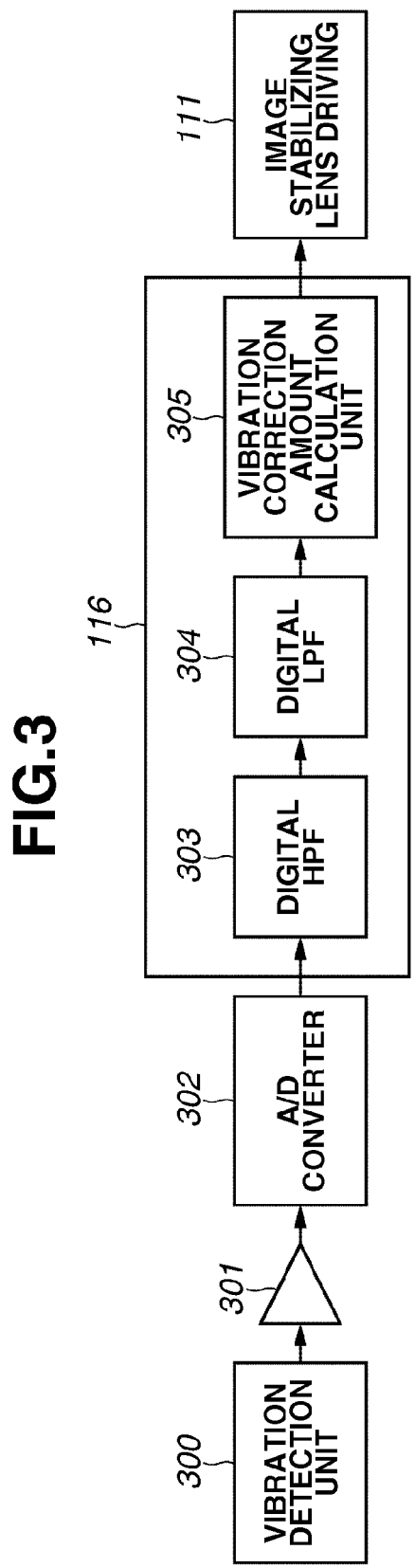
FIG. 3 is a block diagram illustrating a circuit configuration example concerning image stabilizing control.

FIG. 3 is a block diagram illustrating a circuit configuration concerning the image stabilizing control 116. The circuit configuration includes a vibration detection unit 300 such as an angular speed sensor, an amplifier 301 for amplifying a vibration signal (vibration output) from the vibration detection unit, an analog/digital (A/D) converter 302 for converting the amplified vibration signal into a digital signal, a digital high-pass filter (HPF) 303 capable of changing a cutoff frequency to cut a direct-current (DC) component, and a digital low-pass filter (LFP) 304 for converting an angular speed signal that is a vibration signal into an angular signal.

A vibration correction amount calculation unit 305 calculates a vibration correction amount of the image stabilizing lens 104 from the vibration signal. The digital HPF 303, the digital LFP 204, and the vibration correction amount calculation unit 305 constituting the image stabilizing control 116 are operated mainly by calculation in the CPU. A cutoff frequency of the digital HPF 103 of a shake detection filter is changed according to a vibration amount and the like detected by the vibration detection unit 300. When large vibration caused by shaking during a panning operation where the photographer greatly swings the camera or driving of the zoom lens 102 is detected, there is a possibility that a calculation result of the vibration correction amount calculation unit 305 will be an output to stick the image stabilizing lens 104 to a control movable end in response to the shaking. When the image stabilizing lens 104 is stuck to the control movable end, image stabilizing performance drops, and camera shake is displayed in a display image of an EVF without change.

Thus, when great shaking is detected, the cutoff frequency of the digital HPF 303 is set high, and a response of the image stabilizing lens 120 is suppressed to drive the lens near the center as much as possible. When a vibration amount is reduced, the cutoff frequency is gradually returned to an original low frequency. As a result, the image stabilizing lens 104 can be prevented from sticking to the control movable end in response to great vibration.

When an object is subjected to framing in a super-telephoto state, not only camera shake of a high frequency but also body shaking of a relatively low frequency can be identified in the display image of the EVF. If shaking of a low region caused by body shaking in the super-telephoto state is not prevented, when its influence is large, a problem occurs, that is, even a still object frames out against photographer's intention.

Thus, by setting low the cutoff frequency of the digital HPF 303 and movable up the image stabilizing lens 104 up to the last part of a control movable range to prevent body shaking, unintended framing-out can be prevented. Thus, a processing mode must be switched. As described above, when a priority is given to image stabilizing performance in great shaking of the low region, the cutoff frequency of the digital HPF 303 must be set high. To prevent framing-out caused by body shaking, the cutoff frequency must be set low.

In focus control 117, for example, in contrast autofocus (AF) control, the lens is driven as follows. The focus lens 103 is driven to focus on an object based on focus adjustment information (contrast evaluation value) of a photographing optical system obtained by image processing of the image processing circuit 107.

Figure 4:
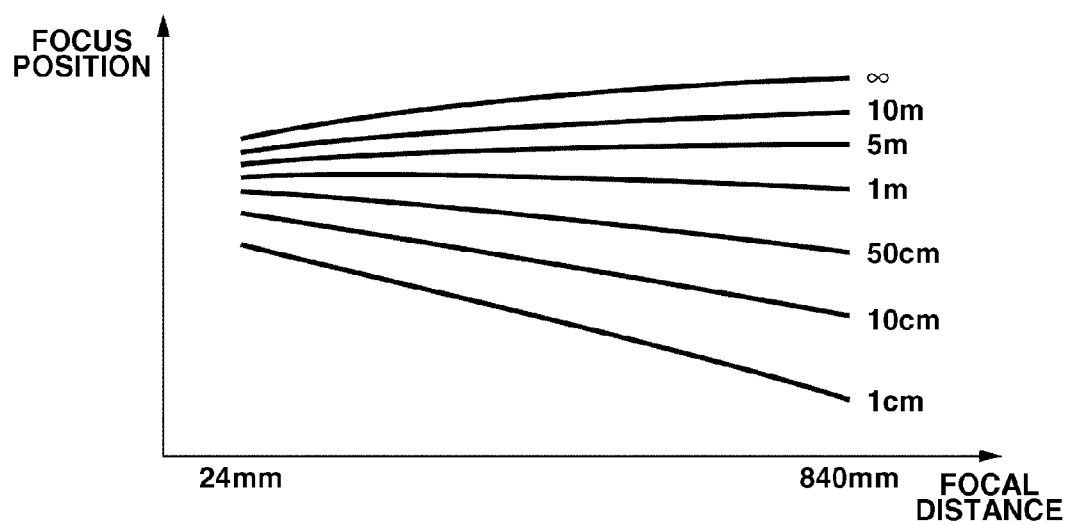
FIG. 4 is a diagram illustrating a relationship between a focal distance and a focus lens position for each object distance.

FIG. 4 is graphic representation of a data table showing a relationship between a focal position of the zoom lens and a focus lens position where the camera comes into focus, for each distance to the object. This table is referred to as a focus cam table. A horizontal axis indicates a focal distance corresponding to a zoom lens position, a vertical axis indicates a focus position, and a distance from the camera to an object (object distance indicated by 10 cm or the like) is drawn beside each graph line.

The focus control 117 performs a scanning operation by controlling the focus lens driving unit 112 to move the focus lens 103 within a predetermined range during the AF operation. A focus lens position that is an in-focus point is detected by an existing method using a contrast evaluation value obtained during the operation. An object distance can be measured from a zoom lens position and a focus lens position at this time by referring to the focus cam table. In application of the present invention, irrespective of focus adjustment control, a phase difference AF method or a method combined with other methods can be employed.

In manual focus (MF) control, a focus is adjusted by moving the focus lens 103 in a driving direction at a focus driving speed according to an instructed amount described below by an operation unit 123. A focus lens position with respect to a minimum object distance and a maximum object distance can be calculated by using the focus cam table. A MF function is realized by moving the focus lens between these focus lens positions at a designated driving speed.

The digital camera 100 has an optical zooming function and an electronic zooming function. The operation unit 123 includes a zoom lever serving as a zoom operation member (control operation unit) used by the photographer to instruct zooming to the camera. A zoom driving speed and a driving direction are calculated based on an operation amount and an operation direction of the zoom operation member used for zoom operation instruction, and a zooming operation is performed according to the calculation result.

At the time of changing a field angle by optical zooming, as can be understood from the focus cam table, to maintain an in-focus state, the focus lens 103 must be moved to an appropriate focus position according to a position of the zoom lens 102. Such control is referred to as computer zoom (CZ) control. CZ zoom control 118 and the zoom lens driving unit 113 are responsible for optical zoom driving. The CZ control 119 controls the zoom lens 102 and the focus lens 103 so that a focus can follow a distance of the object calculated by the AF control or the MF control. During the optical zooming operation, the position of the zoom lens 102 is detected for each predetermined control period, and a focus lens position is calculated from the zoom lens position and the object distance by using the focus cam table to drive the focus lens 103. Thus, the optical zooming operation can be performed while maintaining the in-focus state.

Electronic zooming control 119 and the image memory 108 are responsible for electronic zooming driving. The electronic zooming control 119 realizes an electronic zooming function by cutting out a target region from image data transferred to the image memory 108. By gradually widening a range of cutting out at a frame rate period of a video captured in the image sensor 106 and displaying it on the display unit 109, smooth electronic zooming displaying can be realized.

The system control 120, which is a mode changing unit, analyzes an operation of the operation unit 123, and issues an instruction to each control unit to realize various functions. During a photographing operation, by pressing a release switch, the image sensor 106 and the image processing circuit 107 are instructed to generate image data in the image memory 108. The image data is recorded in one or both of a recording unit 122 and a non-volatile memory 124 via an interface (I/F) unit 121.

Similarly, zoom adjustment, focus adjustment, exposure adjustment, and an image stabilizing start/end are realized by analyzing the operation of the operation unit (operation unit or control operation unit) 123 by the system control (mode changing unit) 120, and instructing various control units 115 to 118. Thus, when an operation is instructed by the operation unit, the mode changing unit for changing various operation modes of the control units simultaneously changes operation modes of at least two control units or control amounts in the operation modes.

Referring to FIGS. 5 to 8, as the present exemplary embodiment, an example where in a lens-integrated digital camera, modes of the control units of a relevant function or control amounts in the operation modes are changed according to a state of the mode changing switch will be described.

Figure 5A:
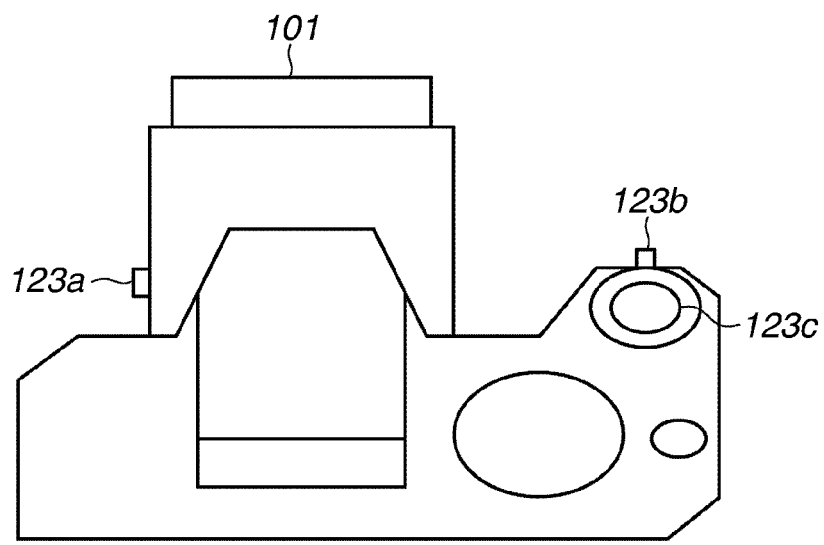
FIGS. 5A and 5B are respectively an upper surface diagram and a rear surface diagram of an appearance example of a lens-integrated digital camera.
Figure 5B:
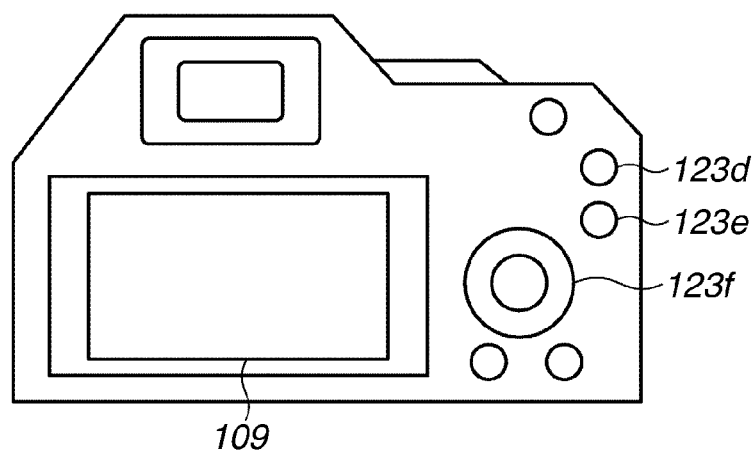

FIGS. 5A and 5B are respectively an upper surface diagram and a rear surface diagram of an appearance of the lens-integrated digital camera. Operation members 123a to 123f of the operation unit 123 according to the present exemplary embodiment will be described. The mode changing switch (operation unit) 123a is arranged at a position to be operable by a left thumb without changing a grip posture when the lens barrel 101 is supported by a left hand (hand opposite a dominant hand) to be gripped.

Various shapes can be employed for the mode changing switch 123a, such as a button type for giving an instruction by pressing or a slide lever type. In the button type, a method for setting pressing period of the button as an ON state and a released period as an OFF state, or a method for toggling between an ON state and an OFF state for each pressing of the button can be employed.

The zoom lever 123b, which is a zooming operation unit of the control operation unit, is arranged at a position to be operable by a right index finger when the digital camera 100 is gripped from the right side by the right hand. The zoom lever 123b can designate a zoom driving direction and a driving speed based on an operation direction and an operation amount. When the zoom lever 123b is operated to the right, zooming is instructed in a telephoto direction. When the zoom lever 123b is operated to the left, zooming is instructed in a wide direction.

Zooming is performed fast when the zoom lever 123b is operated largely (up to a maximum movable range), and slow when operated small (up to halfway through the movable range). A zoom driving speed in optical zooming can be achieved by changing a driving speed of the zoom lens 102. In electronic zooming, a zoom driving speed can be achieved by changing an updating period of a cutting-out and displaying range.

Figure 6A:
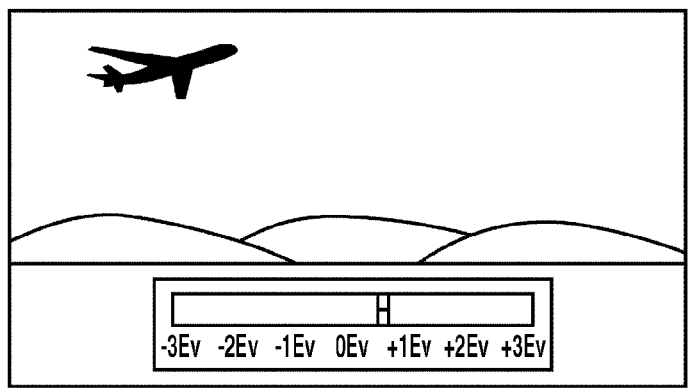
FIGS. 6A, 6B, 6C, and 6D are diagrams illustrating operation screen examples of exposure correction, program shifting, and manual focus (MF).

When the exposure correction button 123d is pressed, an exposure correction operation screen illustrated in FIG. 6A is displayed on the display unit 109. When a leftward key of the cross-key 123f is pressed in a state illustrated in FIG. 6A, a cursor is moved to the left, and exposure is corrected in an under direction by a predetermined number of stages. Similarly, when a rightward key of the cross-key 123f is pressed, the cursor is moved to the right, and exposure is corrected in an over direction by a predetermined number of stages.

Figure 6B:
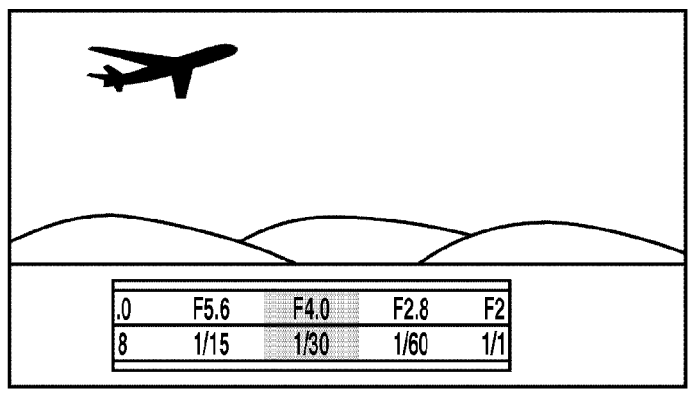

By pressing the exposure correction button 123d while half-pressing the release switch 123c, exposure can be fixed (AE locking). During the AE locking, an operation screen of program shifting illustrated in FIG. 6B is displayed. When a changing instruction of pressing left and right keys of the cross-key 123f is issued in a state illustrated in FIG. 6B, a changing amount of combination of a diaphragm value and a shutter speed can be changed while an exposure value is maintained.

Figure 6C:
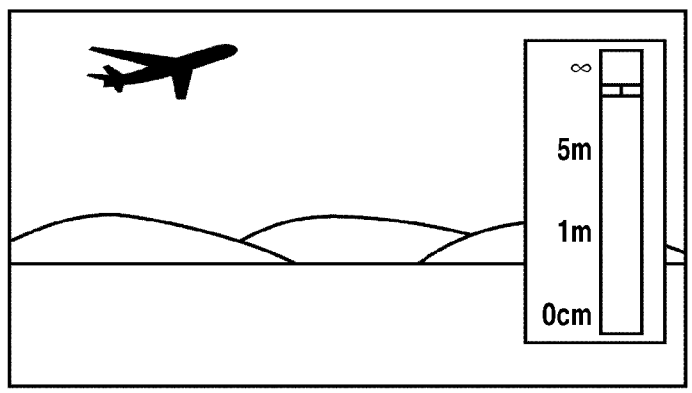

The focus mode switching button 123e can switch a mode of AF/MF for each pressing of the button. When a focus mode is selected to be a MF mode, a MF operation screen illustrated in FIG. 6C is displayed on the display unit 109. Instructions can be made by pressing upper-lower and left-right keys of the cross-key 123f.

When the upper-direction key of the cross-key 123f is pressed in a state illustrated in FIG. 6C, the cursor is moved in an upper direction, and the focus lens 103 is driven in an infinity distance direction. Similarly, when the lower-direction key of the cross-key 123f is pressed, the cursor is moved in a lower direction, and the focus lens 103 is driven in a closest distance direction. Further key pressing time is measured, and when the pressing continues for a predetermined time or more, a focus speed is set high. By pressing the focus mode switching button 123e while half-pressing the release switch 123c when a focus mode is the AF mode, a focus can be fixed (AF locking). In this case, the focus mode is the MF mode and, by pressing the upper-lower key of the cross-key 123f, the focus lens 103 can be driven.

As described above, by operating the operation unit (pressing the mode changing switch 123a) arranged at the position to be operable by the left hand and configured to give an operation instruction to the mode changing unit, the following can be performed. That is, the control modes of at least two of the CZ control 118, the focus control 117, the exposure control 115, and the image stabilizing control 116, or control amounts of each of the controls such as the zoom speeds, the focus speeds, the numbers of program shifting stages, or the image stabilizing cutoff frequencies can be simultaneously changed.

Changing of various operation modes by the mode changing unit is, for example, as follows. The CZ control 118 is for changing between a low zoom speed mode and a normal zoom speed mode, and the focus control 117 is for changing between AF locking and AF lock releasing. The exposure control 115 is for changing AE locking and AE lock releasing, and the image stabilizing control 116 is for changing between the framing priority image stabilizing mode and the photographing priority image stabilizing mode.

As illustrated in FIGS. 5A and 5B, the mode changing switch 123a is arranged at a position to be operable by a hand of the opposite hand for operating the operation members 123b to 123f of the respective functions. Accordingly, mode switching (mode changing) or a photographing setting operation (operation instruction of a control target by the control unit) can be quickly performed without changing a gripping posture.

Next, referring to FIG. 7, a procedure of mode switching processing will be described. FIG. 7 is a flowchart illustrating an example of switching processing of each mode of image stabilizing control, focus control, and exposure control when the mode changing switch 123a is operated. In step S100, whether the mode changing switch 123a is ON is determined. If it is determined that the mode changing switch 123a is ON (YES in step S100), the processing proceeds to step S101. In step S101, the image stabilizing control mode is switched to the framing priority mode.

In the framing priority mode, by setting the cutoff frequency of the digital HPF 303 to low, framing-out of an object caused by body shaking is prevented. In step S102, the zoom speed mode is changed to a low speed mode to facilitate fine adjustment of a field angle. In step S103, AE locking is performed. During the AE locking, a program shift mode is set, and a combination of a diaphragm value and a shutter speed can be changed by operating the left and right keys of the cross-key 123f.

Figure 6D:
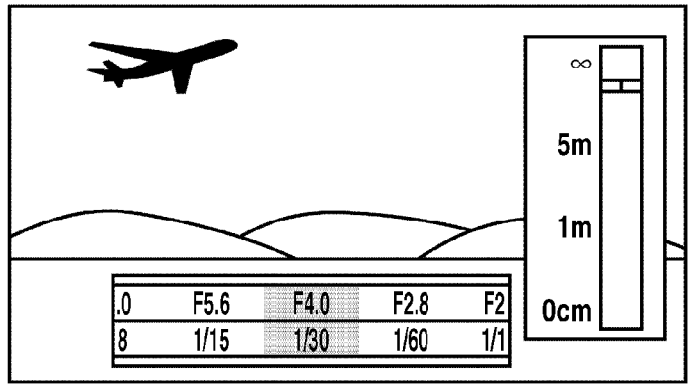

In step S104, AF locking is performed. During the AF locking, the MF mode is set, and an in-focus position can be adjusted by operating the upper and lower keys of the cross-key 123f. FIG. 6D illustrates an operation screen when program shifting and MF are both operable. In a horizontal direction of the screen lower portion, a bar indicating a combination of a diaphragm value and a shutter speed of the program shifting is displayed. In a vertical direction of the screen right portion, a bar indicating a MF distance is displayed. Accordingly, it is indicated that values can be changed by operating the left and right keys and the upper and lower keys of the cross-key 123f.

Processing of steps S105 to S117 is performed when the zoom lever 123b and the cross-key 123f are operated in an ON state of the mode changing switch 123a. In step S105, whether the zoom lever 123b has been operated is determined. If it is determined that the zoom lever 123b has been operated (YES in step S105), the processing proceeds to step S106. In step S106, zooming is controlled in a wide direction or a telephoto direction according to an operation direction of the zoom lever. A zoom speed at this time is a low speed mode set in step S102.

In step S107, whether the zoom lens 102 has reached a wide end/telephoto end is determined. In step S108, whether the operation of the zoom lever has ended is determined. When it is determined that the zoom lens 102 has reached the end (YES in step S107), or when it is determined that the zoom lever operation has ended (YES in step S108), the zoom control ends to return to determination of the operation state (state of the control operation unit).

In step S109, whether the left/right key of the cross-key 123f has been operated is determined. If it is determined that the left/right key of the cross-key 123f has been operated (YES in step S109), the processing proceeds to step S110. In step S110, a combination of a diagram value and a shutter speed is changed according to an operation direction of the left/right key. In step S111, whether the diaphragm value has reached an open end or a small diaphragm end is determined. In step S112, whether a shutter speed limit has been reached is determined. In step S113, whether the operation of the left/right key has ended is determined. When it is determined that the diaphragm value and the shutter speed have reached the ends (YES in steps S111 and S112), or when it is determined that the operation of the left/right key has ended (YES in step S113), the program shifting ends to return to determination of the operation state.

In step S114, whether the upper/lower key of the cross-key 123f has been operated is determined. If it is determined that the upper/lower key of the cross-key 123f has been operated (YES in step S114), the processing proceeds to step S115. In step S115, a focus is controlled in an infinite direction or a proximate direction according to an operation direction of the upper/lower key. In step S116, whether the focus lens 103 has reached an infinite end/proximate end is determined. In step S117, whether the operation of the upper/lower key has ended is determined. If it is determined that the focus lens 103 has reached the end (YES in step S116), or if it is determined that the operation of the upper/lower key has ended (YES in step S117), the MF control ends to return to determination of the operation state.

In step S118, whether the mode changing switch 123a has been turned OFF is determined. If it is determined that the mode changing switch 123a has not been OFF (NO in step S118), the processing returns to step S105 to continue the changed mode. If it is determined that the mode changing switch 123a has been OFF (YES in step S118), the mode is switched to an original state. In steps S119 and S120, the AF locking and the AE locking are released and, when the release switch 123c is half-pressed, a mode of performing AF and AE is set.

In step S121, the zoom speed mode is changed to a normal mode, namely, a mode enabling changing of the zoom speed associatively with an operation amount of the zoom lever 123. In step S122, the image stabilizing control mode is changed from the framing priority mode to the photographing priority mode, and the cutoff frequency of the digital HPF 303 is changed to a normal band. In the present exemplary embodiment, the example of performing the program shifting by the operation during the AE locking has been described. However, exposure correction may be performed.

The flowchart of FIG. 7 is the example where if the mode changing switch 123a is turned ON, all the modes of the field angle adjustment, the exposure adjustment, and the focus adjustment are changed. However, modes switched by menu operations may be individually selected.

Figure 8:
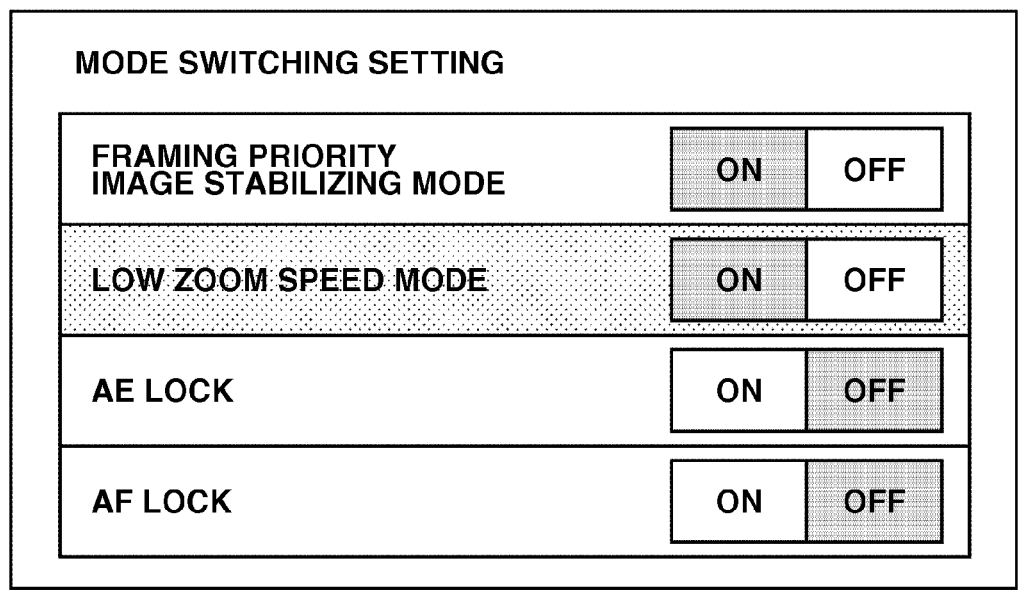
FIG. 8 is a diagram illustrating a setting change screen example of mode switching.

FIG. 8 illustrates a setting change screen of mode switching carried out by the mode change selection unit. On a setting screen, a mode to be changed in setting is selected by the upper/lower key of the cross-key 123f, and changing of individual modes can be turned ON/OFF by the left/right key. For a function turned OFF in mode changing, relevant processing in the flowchart of FIG. 7 is omitted.

By the control operation unit for instructing an operation of a control target by the control unit, for example, the following is performed. For the CZ control 118, a zooming operation is instructed by the zoom lever 123b. For the focus control 117, a MF operation is instructed by the upper/lower key of the cross-key 123f. For the exposure control 115, changing of the number of program shifting states is instructed by the left/right key of the cross-key 123f. For the image stabilizing control 116, a detection unit for detecting hand shake or the like of the photographer equivalent to an operation amount of the control operation unit instructs an operation.

A second exemplary embodiment will be described. Hereinafter, referring to FIGS. 9 to 13A to 13D, the second exemplary embodiment of the present invention will be described. An example where a mode changing unit changes control amounts of relevant functions of a plurality of control units according to a mode changing switch state of an operation unit and an operation amount of an operation member (control operation unit) will be described. In the present exemplary embodiment, a mode of fine-adjusting a composition of a field angle, a focus and exposure is set if a mode changing switch is ON, and a mode of changing the composition at a high speed is set if the mode changing switch is OFF. Portions having codes similar to those illustrated in FIG. 7 are similar in processing, and thus description will be partially omitted.

Figure 9:
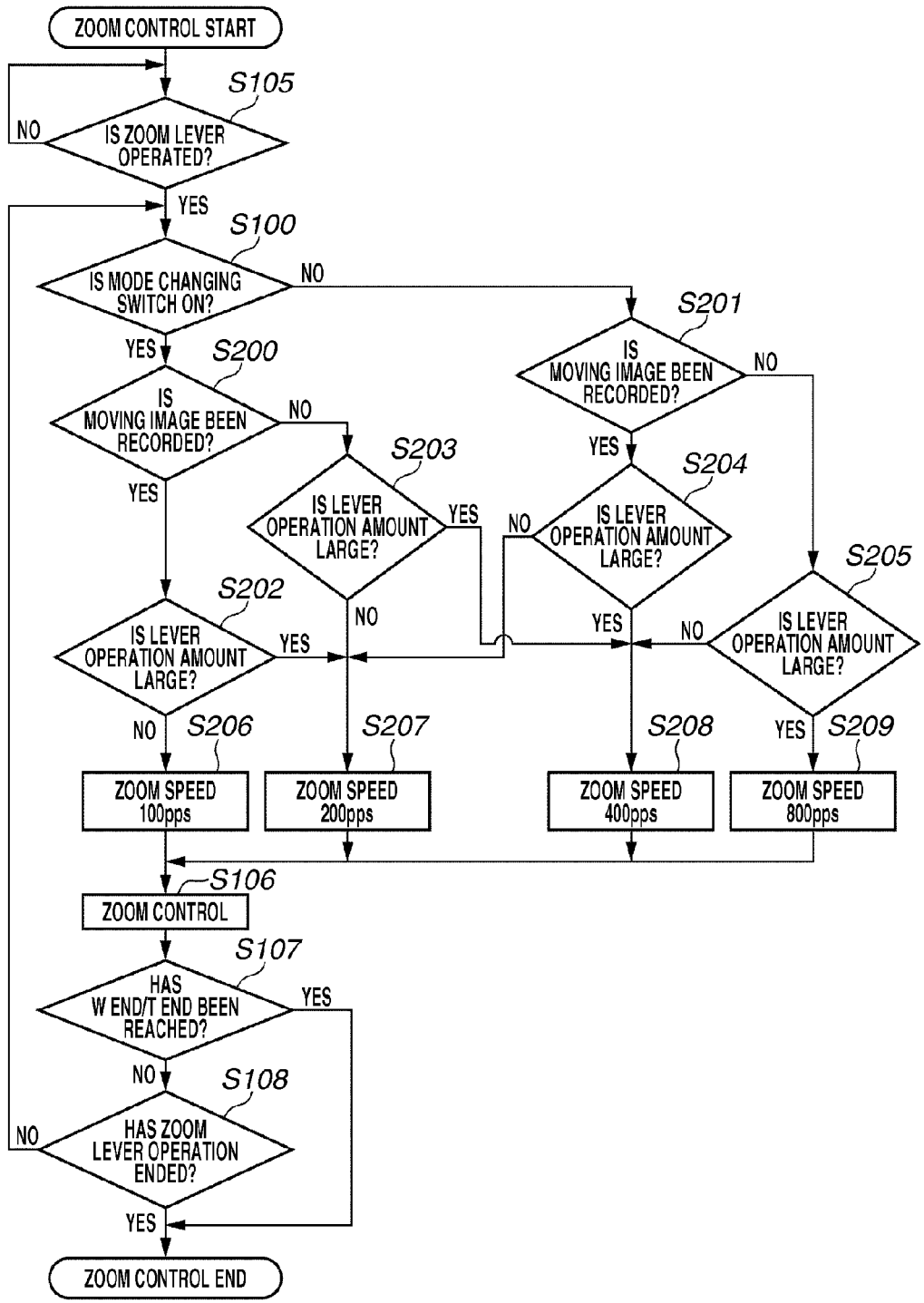
FIG. 9 is a flowchart illustrating a processing example of a control amount change in zoom control.

FIG. 9 is a flowchart illustrating processing of control amount changing in zoom control. A zoom speed that is a control amount of zoom control is changed according to a mode changing switch state of an operation unit, presence of ongoing moving image recording, or a lever operation amount when a zoom lever is operated. In step S105, whether the zoom lever 123b has been operated is determined. If the zoom lever 123b has been operated (YES in step S105), the processing proceeds to step S100. In step S100, whether the mode changing switch 123a is ON is determined. If the mode changing switch 123a is ON (YES in step S100), the processing proceeds to step S200. If the mode changing switch 123a is OFF (NO in step S100), the processing proceeds to step S201.

In steps S200 and S201, whether a photographing state is ongoing moving image recording is determined. In the case of ongoing moving image recording (YES in steps S200 and S201), there is a possibility that driving sounds of the zoom lens 102 and the focus lens 103 will be recorded in the moving image, and thus these lenses must be driven at a speed as low as possible. In the present exemplary embodiment, at equal to or less than 400 pps, it is quiet such that no driving sound is recorded. In steps S202 to S205, a size of an operation amount of the zoom lever 123b is determined.

As described above, a zoom speed is determined based on the combination of the mode changing switch state, the photographing state, and the zoom lever operation amount. FIG. 13A illustrates a relationship between such combinations and zoom speeds. After the zoom speed has been determined in steps S206 to S209, the processing proceeds to step S106 to start zoom control. In steps S106 to S108, processing of determination as to whether the zoom has reached the wide end/telephoto end or processing of an end of a zoom lever operation is performed. However, detailed description will be omitted because the processing is similar to that illustrated in FIG. 7.

Figure 10:
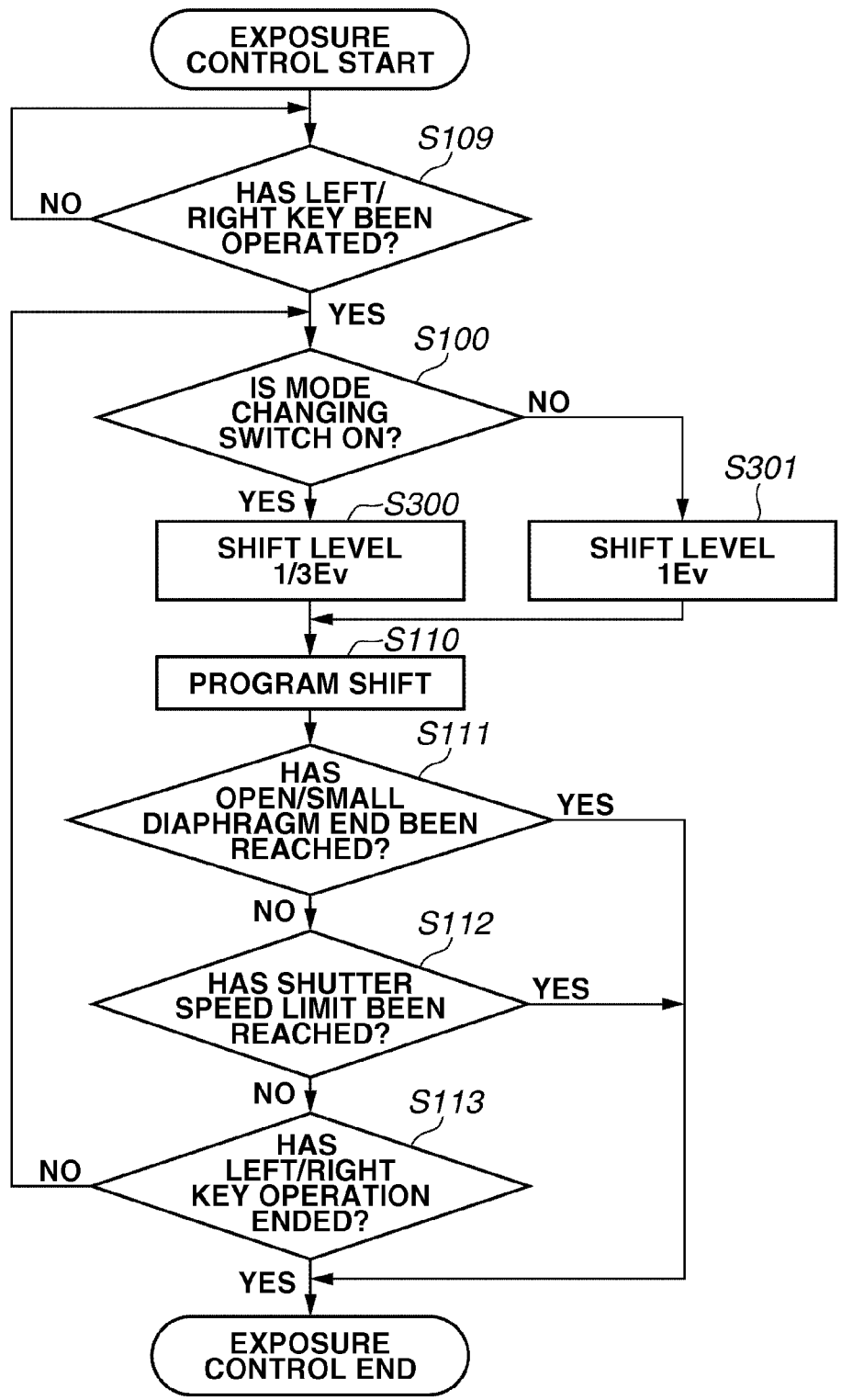
FIG. 10 is a flowchart illustrating a processing example of a control amount change in exposure control.

FIG. 10 is a flowchart illustrating processing of control amount changing in exposure control. Processing in a case where program shifting can be performed by a left/right key operation during AE locking will be described. The number of shifting stages that is a control amount of the program shifting is changed according to a mode changing switch state of the operation unit if the left/right key is operated on the program shift operation screen. In step S109, whether the left/right key of the cross-key 123f has been pressed is determined. If it is determined that the left/right key of the cross-key 123f has been pressed (YES in step S109), the processing proceeds to step S100. In step S100, whether the mode changing switch 123a is ON is determined. If it is determined that the mode changing switch 123a is ON (YES in step S100), the processing proceeds to step S300 to set the number of shifting stages to ⅓ Ev. If it is determined that the mode changing switch 123a is OFF (NO in step S100), the processing proceeds to step S301 to set the number of shifting stages to 1 Ev.

FIG. 13B illustrates a relationship between mode changing switch states and the numbers of shifting stages. After the number of shifting stages has been determined in steps S300 and S301, the processing proceeds to step S110 to start program shifting. In steps S111 to S113, processing of determination as to whether a diaphragm value and a shutter speed reaches the movable end or processing until an end of a key operation is performed. However, detailed description will be omitted because the processing is similar to that illustrated in FIG. 7. In a case where an exposure control function is not program shifting but exposure correction, similar processing will be performed by replacing the number of shifting stages of the exposure control amount with the number of exposure correction stages.

Figure 11:
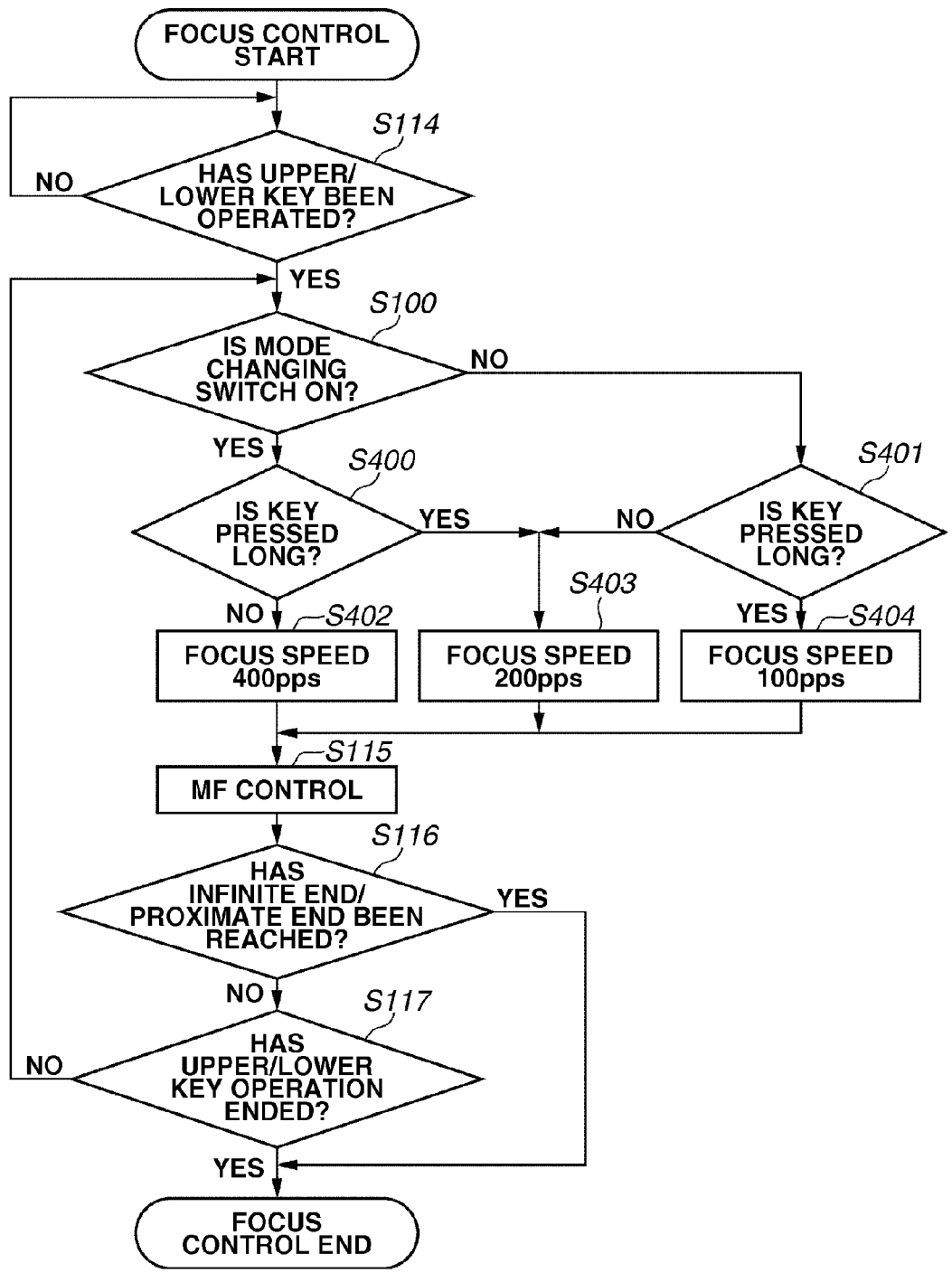
FIG. 11 is a flowchart illustrating a processing example of a control amount change in focus control.

FIG. 11 is a flowchart illustrating processing of control amount changing in focus control. Processing in a case where MF control can be performed by an upper/lower key operation during AF locking will be described. A focus speed that is a control amount of the focus control is changed according to a mode changing switch state of the operation unit and key pressing time when the upper/lower key is operated on the MF operation screen. In step S114, whether the upper/lower key of the cross-key 123f has been pressed is determined. If the upper/lower key of the cross-key 123f has been pressed (YES in step S114), the processing proceeds to step S100, and pressing start time of the upper/lower key is saved.

In step S100, whether the mode changing switch 123a is ON is determined. If it is determined that the mode changing switch 123a is ON (YES in step S100), the processing proceeds to step S400. If it is determined that the mode changing switch 123a is OFF (NO in step S100), the processing proceeds to step S401. In steps S400 and S401, current time is measured. In a case where a period elapsed from the pressing start time of the upper/lower key is equal to or more than a predetermined period, a long pressing state is determined. A focus speed is determined based on a combination of a mode changing switch state and upper/lower key pressing time.

FIG. 13C illustrates a relationship between the above combination and focus speeds. After the focus speed has been determined in steps S402 to S404, the processing proceeds to step S115 to start focus driving. In steps S116 and S117, processing of determination as to whether a focus reaches the infinite end/proximate end and processing of an end of an upper/lower key operation is performed. However, detailed description will be omitted because the processing is similar to that illustrated in FIG. 7.

Figure 12:
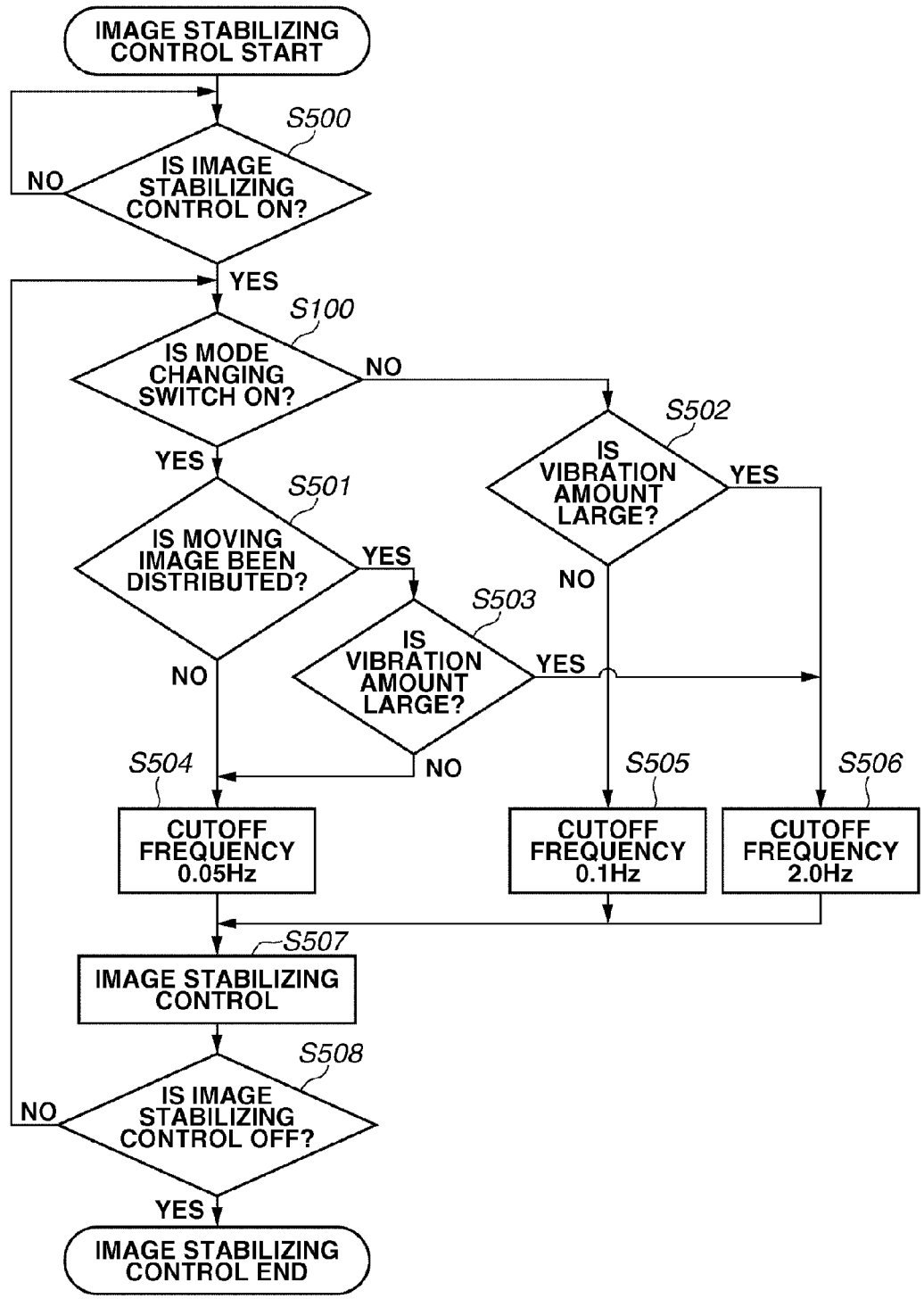
FIG. 12 is a flowchart illustrating a processing example of a control amount change in image stabilizing control.

FIG. 12 is a flowchart illustrating processing of control amount changing in image stabilizing control. A cutoff frequency of the digital HPF 303 that is a control amount of the image stabilizing control is changed according to a mode changing switch state of the operation unit, presence of ongoing moving image recording, and a vibration amount detected by the vibration detection unit 300. The framing priority image stabilizing mode is a mode for reducing the cutoff frequency of the digital HPF 303 to prevent, when a still object is continuously captured, framing-out because of vibration of a low region caused by body shaking.

On the other hand, if great vibration such that framing follows a moving object is detected, there is a possibility that the image stabilizing lens 104 will stick to the movable control end. In a case where sticking to the movable end occurs, image stabilization does not work, and a camera shake state is recorded as a moving image during moving image recording. To prevent this, the cutoff frequency is increased to drive the lens near the center.

However, during framing of a still image, particularly during photographing in a super-telephoto state, there is a possibility that a driving operation near the center will cause framing-out of even the still object. Thus, the cutoff frequency is not changed except during moving image recording in the framing priority image stabilizing mode. On the other hand, in the photographing priority image stabilizing mode, to prevent sticking to the movable end during framing of the still image from reducing image stabilizing performance, the cutoff frequency is increased when great vibration is detected.

A processing flow will be described along the flowchart of FIG. 12. In step S500, whether the image stabilizing control is ON is determined. If it is determined that the image stabilizing control is ON (YES in step S500), the processing proceeds to step S100. In step S100, whether the mode changing switch 123a of the operation unit is ON is determined. If it is determined that the mode changing switch 123a is ON (YES in step S100), the processing proceeds to step S501 understanding that the framing priority image stabilizing mode has been set. If it is determined that the mode changing switch 123a is OFF (NO in step S100), the processing proceeds to step S502 understanding that the photographing priority image stabilizing mode has been set.

In step S501, whether a photographing state is ongoing moving image recording is determined. If it is determined that the photographing state is not ongoing moving image recording (NO in step S501), the processing proceeds to step S504. In steps S502 and S503, a size of a shaking amount is determined. A cutoff frequency is determined based on a combination of a mode changing switch state, a photographing state, and a shaking amount. FIG. 13D illustrates a relationship between such combinations and cutoff frequencies. After the cutoff frequency has been determined in steps S504 to S506, the processing proceeds to step S507 to start image stabilizing control. In step S508, whether the image stabilizing control is OFF is determined. The processing from step S100 is repeated until the control is OFF, and the image stabilizing control is continued.

The following is performed by detecting the operation amount of the zoom lever 123b, detecting the pressing time of the upper/lower key of the cross-key 123f, detecting the pressing time of the left/right key of the cross-key 123f, and detecting a shaking amount of the photographer. A control amount of the control unit is changed according to one of a mode selected by a photographing mode selection unit for selecting one of a plurality of photographing modes such as a still image recording mode and a moving image recording mode and the operation amount detected by the detection unit, or both. In other words, the zoom speed, focus speed, number of program shifting stages, and image stabilizing cutoff frequency can be changed according to one of the mode selection states, i.e., the still image recording mode and the moving image recording mode, and the zoom lever operation amount, key pressing time, and detection amount of vibration amount, or both.

A third exemplary embodiment will be described. The third exemplary embodiment of the present invention is an application example to a lens-changeable digital camera that is an example of an imaging apparatus.

Figure 14A:
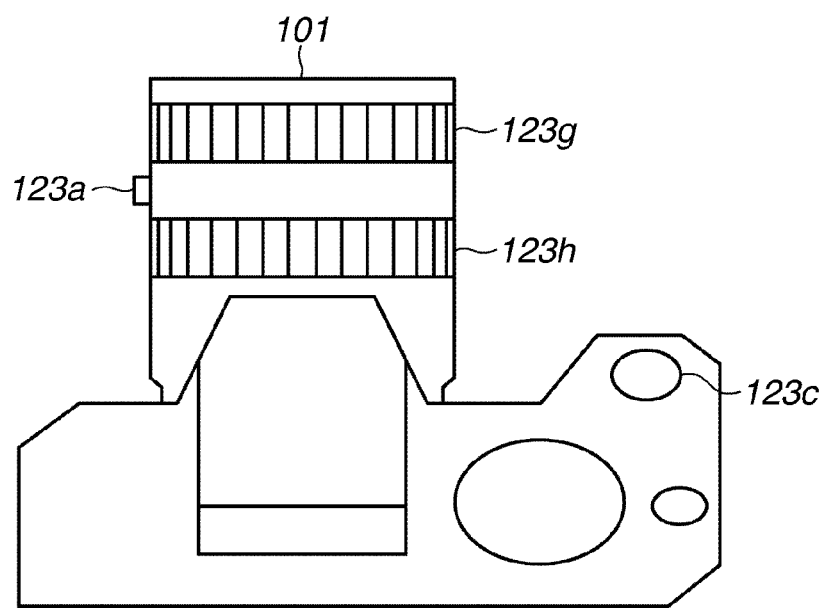
FIGS. 14A and 14B are diagrams illustrating an upper surface and a rear surface of an appearance example of a lens-changeable digital camera.
Figure 14B:
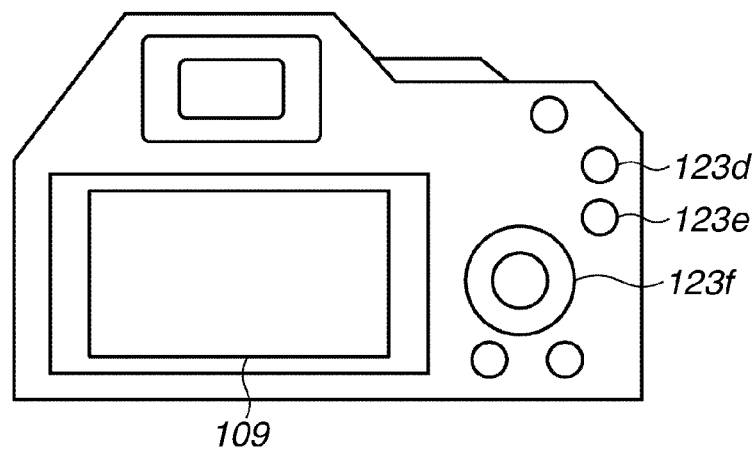

FIGS. 14A and 14B are diagrams illustrating an upper surface and a rear surface of an appearance of a lens-changeable digital camera. Among operation members of operation units (operation unit, control operation unit, and mode change selection unit) 123, differences from FIGS. 5A and 5B illustrating the appearance of the lens-integrated digital camera will be described.

In the lens-integrated digital camera, the zoom operation member (control operation unit) is arranged as the zoom lever 123b at the position to be operable by the right index finger. In the lens-changeable digital camera, an operation is performed on the lens side, and the zoom operation member is circumferentially arranged as a zoom ring 123g around the lens barrel 101. Thus, an operation of rotating the zoom ring 123g while keeping the mode changing switch 123a ON is difficult. In this case, a zoom control mode and a control amount are not changed interlockingly with the mode changing switch 123a.

An operation member of MF control is circumferentially arranged as a focus ring 123h around the lens barrel 101. Thus, as in the case of the zooming operation, an operation of rotating the focus ring 123h while keeping the mode changing switch 123a ON is difficult. A MF control mode and a control amount are not changed interlockingly with the mode changing switch 123a.

Thus, functions of changing a mode and a control amount by an operation instruction of the mode changing switch (operation unit) 123a can be limited to an image stabilizing function and an exposure control function simultaneously operable with this changing switch according to the arrangement of the operation member (control operation unit) 123. An operation instruction given by the mode changing switch may be limited to one of the functions.

The exemplary embodiments of the present invention have been described. However, the present invention is not limited to the embodiments. Various changes and modifications can be made within the scope and the spirit of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-167832 filed Jul. 28, 2012, which is hereby incorporated by reference herein in its entirety.

What is claimed is:

1. An imaging apparatus configured to receive light passed through an optical system by an image sensor to capture an image of an object, comprising:
   a zoom controller configured to change a field angle by optical zooming or electronic zooming;
   an image stabilizing controller configured to reduce, by controlling an image stabilizing lens, an influence on the image of the object caused by camera shake;
   a plurality of controllers configured to respectively control a plurality of adjustment parameters for determining a photographing condition;
   an operation member configured to be different from an operation switch to switch between auto-focus AF mode and manual focus MF mode and arranged around a lens barrel; and
   a mode changing unit including a memory and a processor, the memory storing a program of instructions, the processor executing the program of instructions to change a first mode to a second mode in a case where an operation is instructed by the operation member, wherein a driven range of the image stabilizing lens by the image stabilizing controller in the second mode is wider than a driven range of the image stabilizing lens by the image stabilizing controller in the first mode, and a zooming speed by the zoom controller in the second mode is slower than a zooming speed by the zoom controller in the first mode.

2. The imaging apparatus according to claim 1, further comprising:
   a focus controller configured to change a focus by driving a focus lens, wherein a focusing speed by the focus controller in the second mode is slower than a focusing speed by the focus controller in the first mode.

3. The imaging apparatus according to claim 2, wherein in the second mode, the focus controller locks a focus position, and changes a focus speed according to the selected mode in a case where changing of the focus position is instructed.

4. The imaging apparatus according to claim 1, wherein in the second mode, the image stabilizing controller changes a cutoff frequency of a vibration detection filter.

5. The imaging apparatus according to claim 1, further comprising a mode changing switch configured to select a controller changed in mode by the mode changing unit.

6. The imaging apparatus according to claim 1, wherein, in a case where the operation is instructed by the operation member, the mode changing unit is configured to change operation modes or control amounts in the operation modes of the zoom controller and the image stabilizing controller so as to reduce an amount of digit operation needed from the user's hand.

7. The imaging apparatus according to claim 1, wherein the operation member is having a two-state switch and configured, in response to activation of the two-state switch by a digit of a user's hand, to instruct the mode changing unit to change the first mode to the second mode, wherein the activation of the two-state switch by the digit of the user's hand is activation while the lens barrel is supported by the user's hand.

8. The imaging apparatus according to claim 7, wherein the two-state switch is configured to have an ON state and an OFF state.

9. The imaging apparatus according to claim 8, wherein control amounts of the adjustment parameters for determining a photographing condition is reduced in a case where the operation member is operated to the ON state from the OFF state.

10. The imaging apparatus according to claim 8, wherein control amounts of the adjustment parameters for determining a photographing condition is reduced while the operation member is in the ON state.

11. The imaging apparatus according to claim 1, further comprising:
   an exposure controller configured to change an exposure amount by driving a diaphragm and a shutter, wherein the exposure amount by the exposure controller in the second mode is fixed.

12. The imaging apparatus according to claim 11, wherein in the second mode, the exposure controller locks an exposure amount, and changes amounts of a diaphragm and a shutter according to the selected mode in a case where changing of the diaphragm and the shutter is instructed.

13. The imaging apparatus according to claim 11, wherein, in the second mode, the exposure controller changes the exposure amount by driving the diaphragm and the shutter in a case that a changing instruction is issued by a key operation.

14. The imaging apparatus according to claim 13, wherein, in the second mode, a changing amount of combination of a diaphragm value and a shutter speed can be changed while an exposure value is maintained.

15. The imaging apparatus according to claim 1, further comprising:
   a display unit, wherein, in the second mode, a bar indicating a combination of a diaphragm value and a shutter speed is displayed on the display unit.

16. The imaging apparatus according to claim 1, further comprising:
   a display unit, wherein, in the second mode, a bar indicating a MF distance is displayed on the display unit.

17. A method for controlling an imaging apparatus, the imaging apparatus configured to receive light passed through an optical system by an image sensor to capture an image of an object, the imaging apparatus including a zoom controller configured to change a field angle by optical zooming or electronic zooming and an image stabilizing controller configured to reduce, by controlling an image stabilizing lens, a influence on the image of an object caused by camera shake, the imaging apparatus also including an operation member configured to be different from an operation switch to switch between auto-focus AF mode and manual focus MF mode and arranged around a lens barrel, the method comprising:

controlling respectively a plurality of adjustment parameters by a plurality of controllers for determining a photographing condition;

changing the various operation modes of the plurality of controllers; and changing a first mode to a second mode in a case where an operation is instructed by the operation member, wherein a driven range of the image stabilizing lens by the image stabilizing controller in the second mode is wider than a driven range of the image stabilizing lens by the image stabilizing controller in the first mode, and a zooming speed by the zoom controller in the second mode is slower than a zooming speed by the zoom controller in the first mode.

\* \* \* \* \*